W. ECKFORD.
APPARATUS FOR THE MANUFACTURE OF LEAD OXID.
APPLICATION FILED OCT. 1, 1912.
1,104,786.
Patented July 28, 1914.
3 SHEETS—SHEET 3.
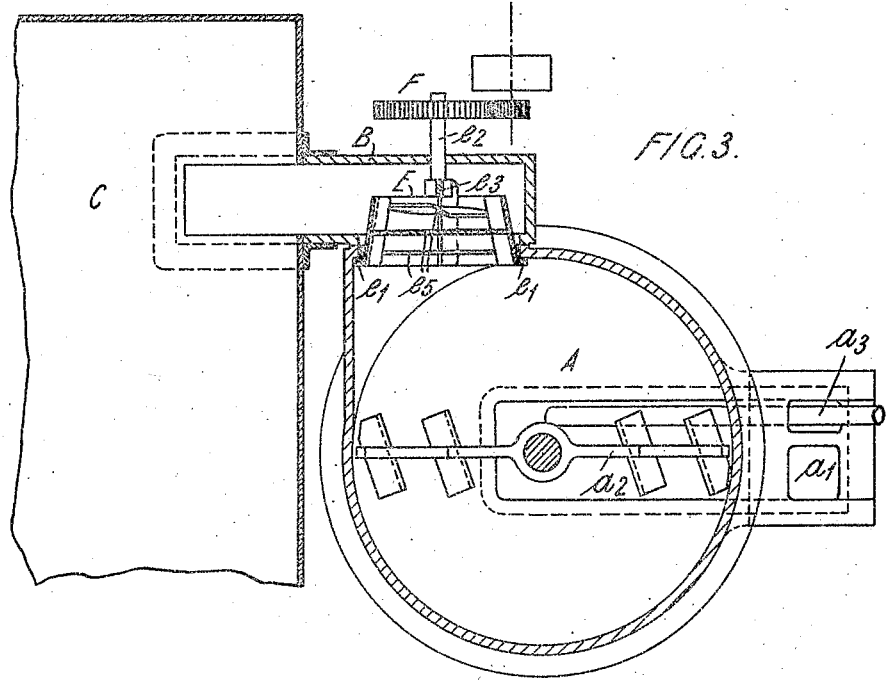
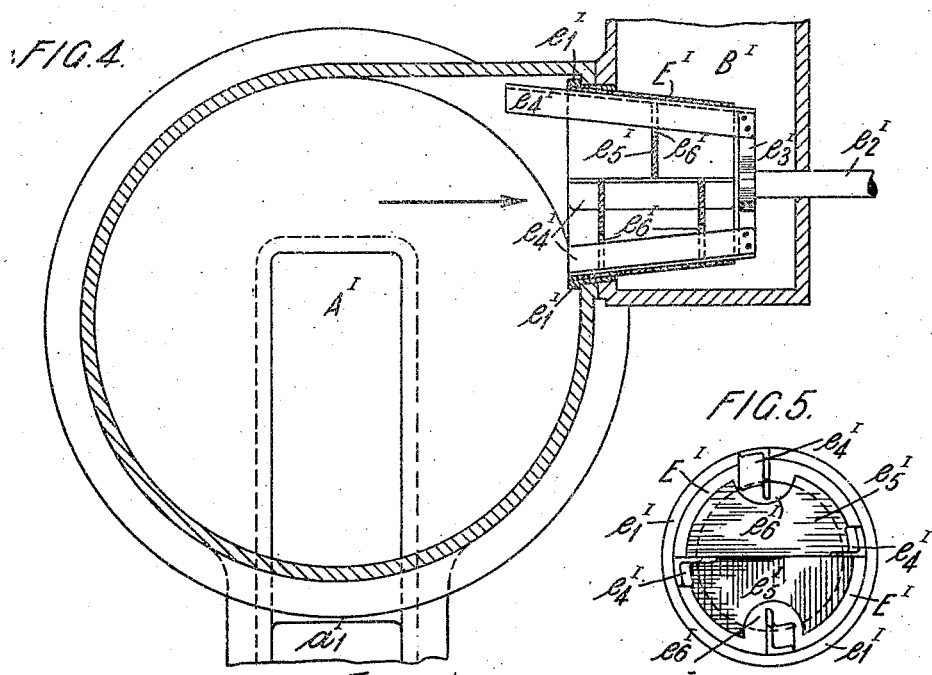
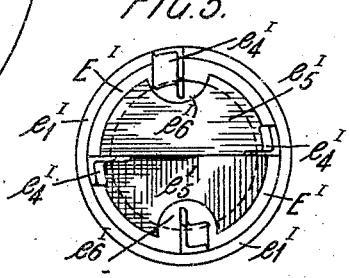
Witnesses:
C. E. Parsons
H. L. Alden
Inventor:—
William Eckford
By Spear, Middleton, Donaldson & Spear
Att'ys.

UNITED STATES PATENT OFFICE.

WILLIAM ECKFORD, OF RHYL, WALES.

APPARATUS FOR THE MANUFACTURE OF LEAD OXID.

1,104,786.  Specification of Letters Patent.  Patented July 28, 1914.

Application filed October 1, 1912. Serial No. 723,388.

*To all whom it may concern:*

Be it known that I, WILLIAM ECKFORD, a subject of the King of Great Britain, and residing in Rhyl, in the county of Flint, North Wales, have invented certain new and useful Improvements in Apparatus for the Manufacture of Lead Oxid, of which the following is a specification.

This invention relates to apparatus for the manufacture of lead oxid, comprising a lead melting pot and settling chambers; the molten lead is converted in the melting pot in any suitable and well known manner into lead oxid which is carried by air currents into settling chambers to be there deposited.

The invention is particularly applicable to melting pots of the type described in the specification to British Letters Patent No. 30354 of 1910 granted to me, and to melting pots connected to the settling chambers in such manner as to maintain a pressure in the said pot and chambers which is somewhat less than that of the surrounding atmosphere, as described in the specification to British Letters Patent No. 26257 of 1908, granted to me.

According to the present invention I fit in the outlet leading from the melting pot to the settling chambers a rotary hopper fitted with diaphragms and vanes, the function of which is to arrest the heavier or grosser particles carried by the stream of air passing from the melting pot to the settling chamber, and to return them to the melting pot.

The invention is illustrated in the accompanying drawings as applied to melting pots constructed and connected to the settling chambers in the manner described in the above mentioned specifications, but it is to be understood that the invention is not restricted to any particular type of lead melting pot, nor to lead melting pots connected to the settling chambers in the manner described.

Figure 1:
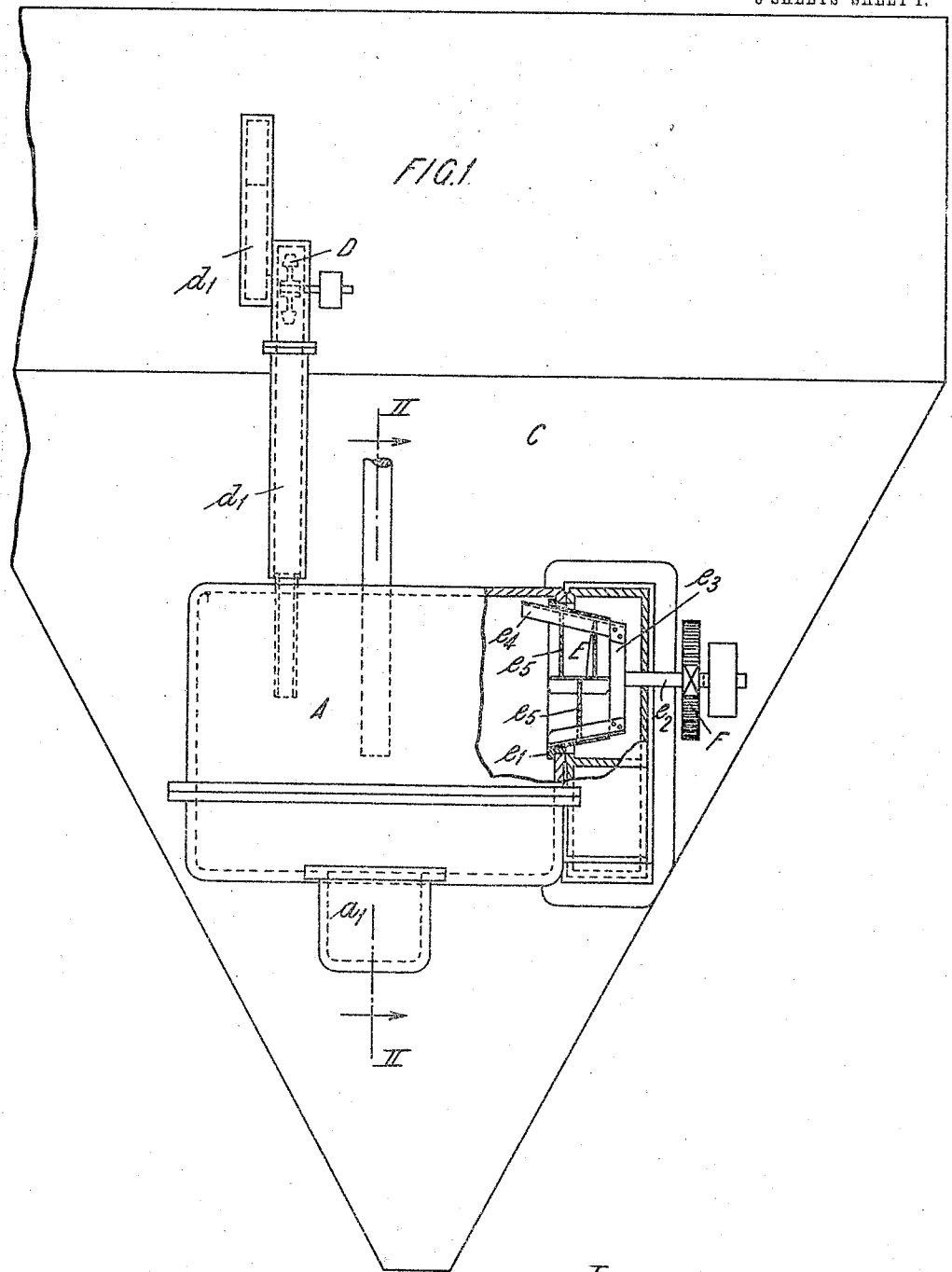
Figure 2:
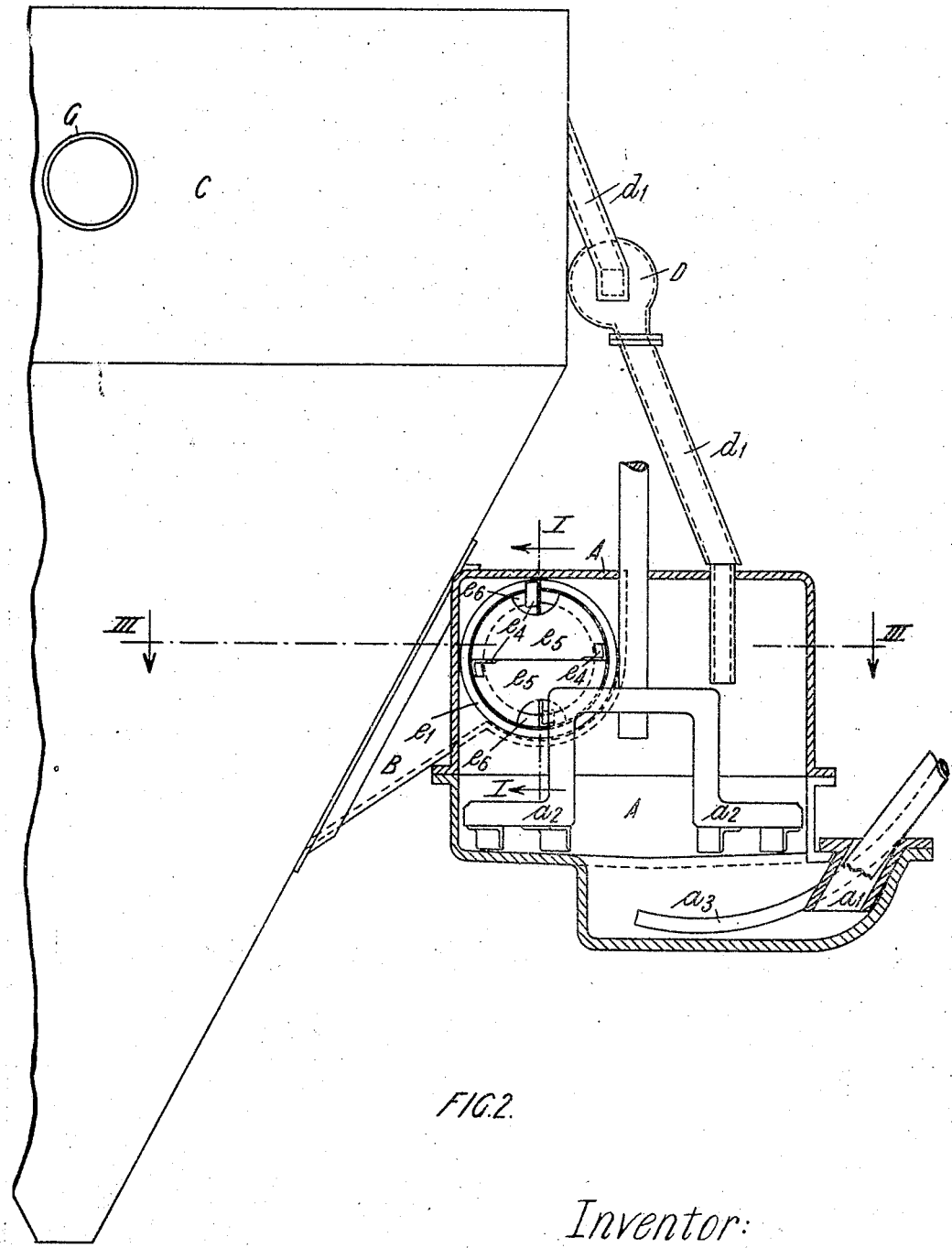

In the drawings, Figure 1 is an elevation of the apparatus with the hopper shown in section on the line I, I, of Fig. 2; Fig. 2 is a side elevation with the melting pot in section on the line II, II, of Fig. 1; Fig. 3 is a plan in section on the line III, III, of Fig. 2; Fig. 4 is a plan, similar to Fig. 3 but to a larger scale, and shows a hopper somewhat longer axially than that shown in Figs. 1 to 3; and Fig. 5 is a detail view of the diaphragms.

A is the lead melting pot; the pigs of lead are fed in at $a^1$, and air, or air and steam, is supplied by the pipe $a^3$, and the dross formed is disintegrated by the beater $a^2$, all as described in the specification first mentioned above. The outlet of the melting pot is connected by a casing B to the first settling chamber C, and the chamber C is connected to the melting pot through a fan D and connecting air trunks $d^1$, the fan serving to circulate the air between the settling chambers and the melting pot by withdrawing air from the former and delivering it to the latter, whence it passes through the casing B to the settling chambers. An exhausting fan G is fitted to the settling chamber, and this fan continuously withdraws air from the system at such a rate, compared with the rate at which air gains access to the system, as to preserve the circulating air throughout the system at a pressure somewhat less than that of the atmosphere, so that any leakage which may take place is an inward leakage, as described in the second above mentioned specification.

The hopper E is located outside the lead melting pot, its inlet end making joint with a suitably arranged opening formed in the wall of the melting pot, the hopper being held in position axially by a suitable ring $e^1$ so that it may rotate in the said opening without lubrication; its outlet end opens into the casing B leading from the melting pot to the settling chambers. The hopper is rotated preferably by a shaft $e^2$ attached by radial arms $e^3$ to the outlet end of the hopper, said shaft passing out of the said casing and being provided with suitable driving means F. The hopper is preferably a frustum of a cone, the inlet end being preferably larger in diameter than the outlet end, and it is fitted with a series of longitudinally disposed vanes $e^4$ of angle irons or the like, each of which may lie in the plane containing the axis of the hopper, or be inclined to the said plane.

Arranged transversely across the hopper are a series of diaphragms $e^5$; these are preferably of semi-circular shape, the diameter of the semi-circle coinciding with the diameter of the hopper, a portion of the diaphragm at the crown of the semi-circle being cut away as at $e^6$ to form a passage-way for the angle irons. The diaphragms are arranged in a staggered manner so that a current of air passing through the hopper is forced to take a zig-zag or a helical path therethrough.

A convenient mode of attaching the shaft $e'_2$ to the hopper E' is to prolong certain of the vanes $e'_4$ and to connect the arms $e'_3$ to the said prolongation as shown. This is illustrated in the modification shown in Figs. 4 and 5. One or more of the vanes $e'_4$ is prolonged into the hopper as shown, the prolongation serving to keep the outlet free from accumulations of dross. The hopper E' is held in position axially by a ring $e'_5$. The parts $e'_5$ and $e'_6$ correspond to the parts $e^6$ and $e^8$ respectively.

The action of the apparatus is as follows: The air passing through the hopper to the settling chambers is laden with lead oxid, together with more or less coarse dross, and some finely divided metallic lead. This air encounters the diaphragms in its zig-zag path through the hopper, and the heavier particles are arrested by the diaphragms and thrown down to the bottom of the rotating hopper, the finer particles of oxid passing through to the settling chambers. The heavier particles which are thrown down to the bottom of the revolving hopper are fed back again into the melting pot by the action of the rotating hopper and vanes.

As stated, the invention is particularly applicable to the apparatus described in my said prior British Patent No. 30354 of 1910, in which the molten lead is first converted into coarse dross, which dross is then disintegrated by a revolving beater, since the revolving hopper intercepts the coarser particles formed in the said apparatus and returns them to the melting pot.

The details of construction of the hopper and the arrangement of the diaphragms and vanes may of course be considerably modified within the limits of my invention,—for instance, the hopper may be cylindrical and its axial length may be increased, in which case the diaphragms may be reduced in number or be dispensed with; or in some cases the diaphragms may be helically arranged so as to propel the arrested material back to the melting pot, in which case the vanes may be dispensed with.

Having now fully described the nature of my invention, I declare that what I claim, and desire to secure by Letters Patent is:—

1. In combination, a lead melting pot, a settling chamber, a rotary hopper one end of which opens directly into the pot and through which the pot communicates with the chamber, and means for rotating the hopper; substantially as described.

2. In combination, a lead melting pot, a settling chamber, a casing connecting the pot to the chamber, a rotary hopper one end of which opens directly into the pot located in said casing, and means for rotating the hopper; substantially as described.

3. In combination, a lead melting pot, a settling chamber, a casing connecting the pot to the chamber, a rotary hopper of taper configuration located in said casing the larger end of the hopper making a rotatable joint with the lead melting pot casing and the other end opening into said casing, and means for rotating the hopper; substantially as described.

4. In combination, a lead melting pot, a settling chamber, a tape ring rotary hopper, through which said pot communicates with said chamber, the larger end of which opens directly into the pot, and means for rotating the hopper; substantially as described.

5. In combination, a lead melting pot, a settling chamber, a rotary hopper through which said pot communicates with said chamber, provided with transverse diaphragms extending partly across the hopper, and means for rotating the hopper; substantially as described.

6. In combination, a lead melting pot, a settling chamber, a rotary hopper provided with transverse diaphragms disposed obliquely and adapted to propel into the lead melting pot material deposited in the hopper, and means for rotating the hopper; substantially as described.

7. In combination, a lead melting pot, a settling chamber, a rotary hopper through which said pot communicates with said chamber, provided with vanes, and means for rotating the hopper; substantially as described.

8. In combination, a lead melting pot, a settling chamber, a rotary hopper through which said pot communicates with said chamber, provided with transverse diaphragms and with vanes, and means for rotating the hopper; substantially as described.

9. In combination, a lead melting pot, a settling chamber, a rotary hopper through which said pot communicates with said chamber, fitted with vanes one of which is prolonged so as to project into the lead melting pot, and means for rotating the hopper; substantially as described.

10. In combination, a lead melting pot, a settling chamber, a rotary hopper through which the pot communicates with the chamber, the lower part of the interior of said rotary hopper being inclined downwardly toward said pot, and means for rotating the hopper; substantially as described.

11. In combination, a lead melting pot, a settling chamber, a rotary hopper of taper configuration arranged tangentially relatively to the pot with the lower end opening directly into the pot through which hopper the pot communicates with the chamber, and means for rotating the hopper; substantially as described.

12. In combination, a lead melting pot, a settling chamber, a rotary hopper through which said pot communicates with said chamber, of taper configuration provided with transverse diaphragms and vanes; substantially as described.

13. In combination, a lead melting pot, a settling chamber, a rotary hopper through which the pot communicates with the chamber, means for rotating the hopper, a second communicating passage-way between the chamber and the pot, and a fan fitted to said passage-way to circulate the air between the pot and the chamber; substantially as described.

14. In combination, a lead melting pot, a settling chamber, a rotary hopper through which the pot communicates with the chamber, means for rotating the hopper, a second communicating passage-way between the chamber and the pot, a fan fitted to said passage-way to circulate the air between the pot and the chamber, and a fan fitted to the chamber and adapted to withdraw air therefrom; substantially as described.

15. In combination, a lead melting pot, a sealed inlet for the introduction of the pig lead, a pipe for conveying the agitating and oxidizing fluid to the molten lead, and a rotary beater to disintegrate the dross formed; a settling chamber, a rotary hopper through which the pot communicates with the chamber, and means for rotating the hopper; substantially as described.

16. In combination, a lead melting pot, a sealed inlet for the introduction of the pig lead, a pipe for conveying the agitating and oxidizing fluid to the molten lead, and a rotary beater to disintegrate the dross formed; a settling chamber, a rotary hopper through which the pot communicates with the chamber, means for rotating the hopper, a fan adapted to withdraw air from the settling chamber and deliver it to the melting pot, and a fan in the settling chamber adapted to maintain the circulating air at a pressure less than that of the atmosphere; substantially as described.

In testimony whereof I affix my signature in presence of two witnesses.

WILLIAM ECKFORD.

Witnesses:
J. E. LLOYD BAME,
JOSEPH E. HIRST.